United States Patent [19]

Borders

[11] 4,422,814
[45] Dec. 27, 1983

[54] GROUND LEVEL DUMP UNIT
[75] Inventor: Ernest D. Borders, Statesville, N.C.
[73] Assignee: Applied Products, Inc., Statesville, N.C.
[21] Appl. No.: 269,467
[22] Filed: Jun. 2, 1981
[51] Int. Cl.³ .............................................. B65G 65/30
[52] U.S. Cl. ................................. 414/303; 414/420; 414/421
[58] Field of Search ............... 414/345, 346, 354, 364, 414/403, 404, 406, 408, 409, 420, 422, 421

[56] References Cited
U.S. PATENT DOCUMENTS

| | | | |
|---|---|---|---|
| 3,452,891 | 7/1969 | Wilson et al. | 414/409 |
| 3,804,277 | 4/1974 | Brown et al. | 414/421 X |
| 3,894,642 | 7/1975 | Shive | 414/421 X |

Primary Examiner—Robert G. Sheridan
Attorney, Agent, or Firm—Hamilton, Renner & Kenner

[57] ABSTRACT

A dump unit (12) for lifting and dumping a waste receptacle (14) into a compactor (10), said unit having slide bars (47) movable on vertical frame channels (21) and a hydraulic cylinder (38) for raising the bars (47). A face plate assembly (26,31,33) is pivoted on a cross bar (36) connecting the upper ends of said slide bars (47) and a second hydraulic cylinder (50) is mounted on a cross bar (49) connecting the lower ends of bars (47) and is operatively connected through linkage (59,63,35) to cross bar (36). A hooked lever (68) is pivoted on face plate (26) for engaging a bar (72) on the receptacle to lock it in inverted position, and a bell crank link (74) connects lever (68) to link (63) for automatically engaging bar (72) as the face plate assembly (26,31,33) is rotated on cross bar (36).

6 Claims, 7 Drawing Figures

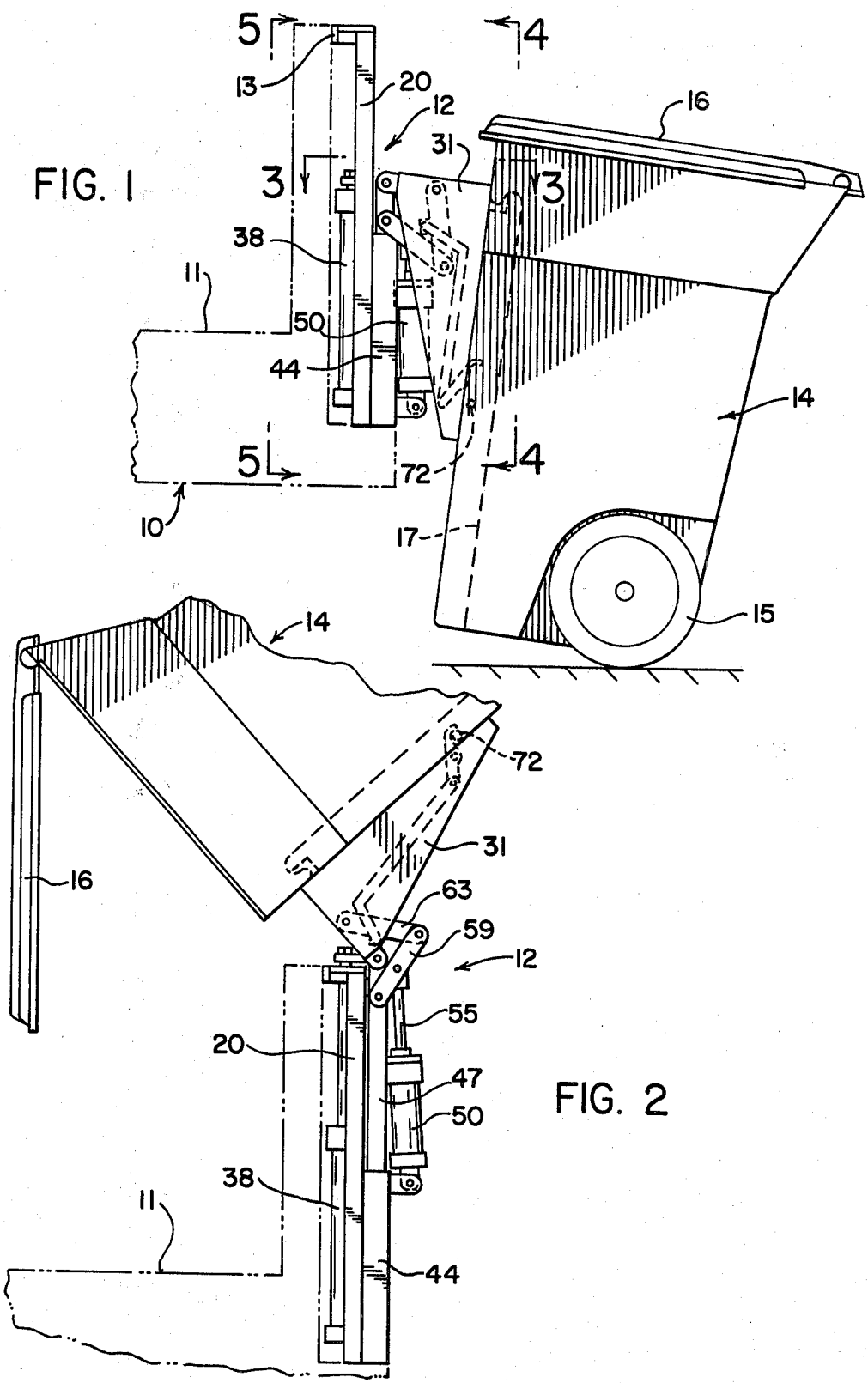

4,422,814

GROUND LEVEL DUMP UNIT

TECHNICAL FIELD

The invention relates to dumping mechanism for lifting mobile receptacles containing lightweight trash or refuse and dumping the trash into a stationary compactor.

BACKGROUND ART

Prior dumping mechanisms of which I am aware for lifting and dumping trash receptacles into compactors are adapted for handling heavy industrial trash such as metal or other solid materials, and accordingly comprise heavy and expensive machinery. Many institutions, such as hospitals, schools and hotels, have their own stationary compactors for compacting lightweight trash such as paper and sweepings, but the trash is collected in a container, usually in a plastic bag, wheeled to the compactor and lifted and dumped therein by hand.

I am not aware of any dumping mechanism designed to be mounted on a stationary compactor for handling lightweight trash and adapted to lift and dump a mobile trash container into the hopper of the compactor.

DISCLOSURE OF INVENTION

The present improved dump unit is adapted to lift a mobile container of lightweight trash from ground level for dumping into the hopper of a compactor.

It is an object of the present invention to provide improved lifting and dumping mechanism for a stationary compactor and adapted to lift and dump a mobile lightweight trash container into the hopper of the compactor.

Another object is to provide an improved lifting and dumping mechanism embodying a linkage giving a mechanical advantage during the lifting and dumping operation.

A further object is to provide improved means automatically operated by the lifting mechanism to lock the container in inverted dumping position.

Another object is to provide improved hydraulic means for lifting the container from ground level to the top of the compactor hopper at the start of the dumping operation.

A still further object is to provide an improved lifting and dumping mechanism for a compactor, which mechanism is simple and inexpensive to construct and operate.

These and other objects are accomplished by the improvements comprising the present invention, a preferred embodiment of which is shown in the drawings and described in the specification hereof as exemplifying the best known mode of carrying out the invention. Various modifications and changes in details of construction are comprehended within the scope of the appended claims.

BRIEF DESCRIPTION OF DRAWINGS

FIG. 1 is a side elevation of a wheeled waste container in position to be lifted and dumped into a compactor by the improved lifting and dumping mechanism.

FIG. 2 is a similar view showing the waste container lifted and inverted to dumping position.

PREFERRED EMBODIMENT OF THE INVENTION

Figure 5:
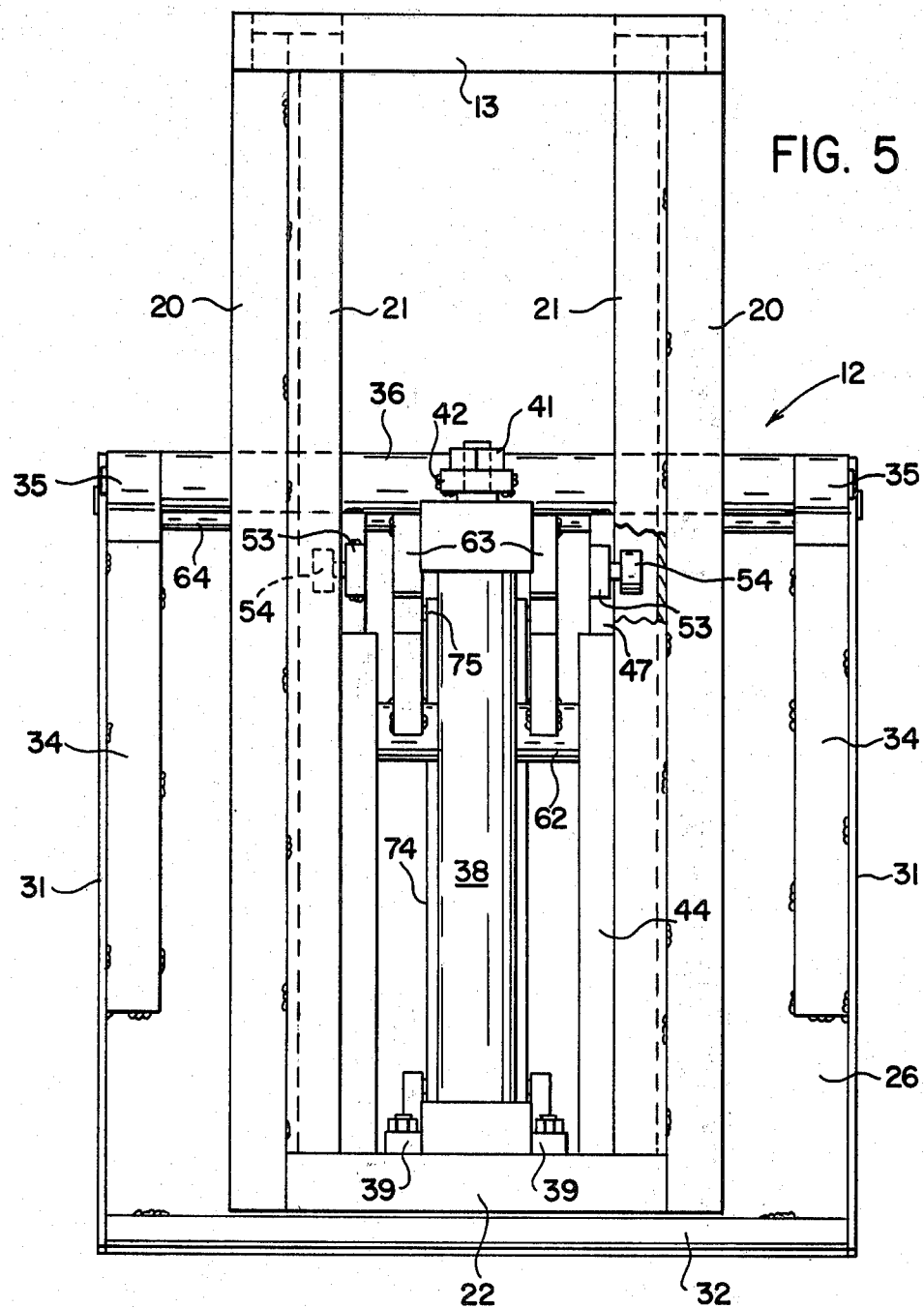
FIG. 5 is an enlarged vertical elevation on line 5—5 of FIG. 1.
Figure 6:
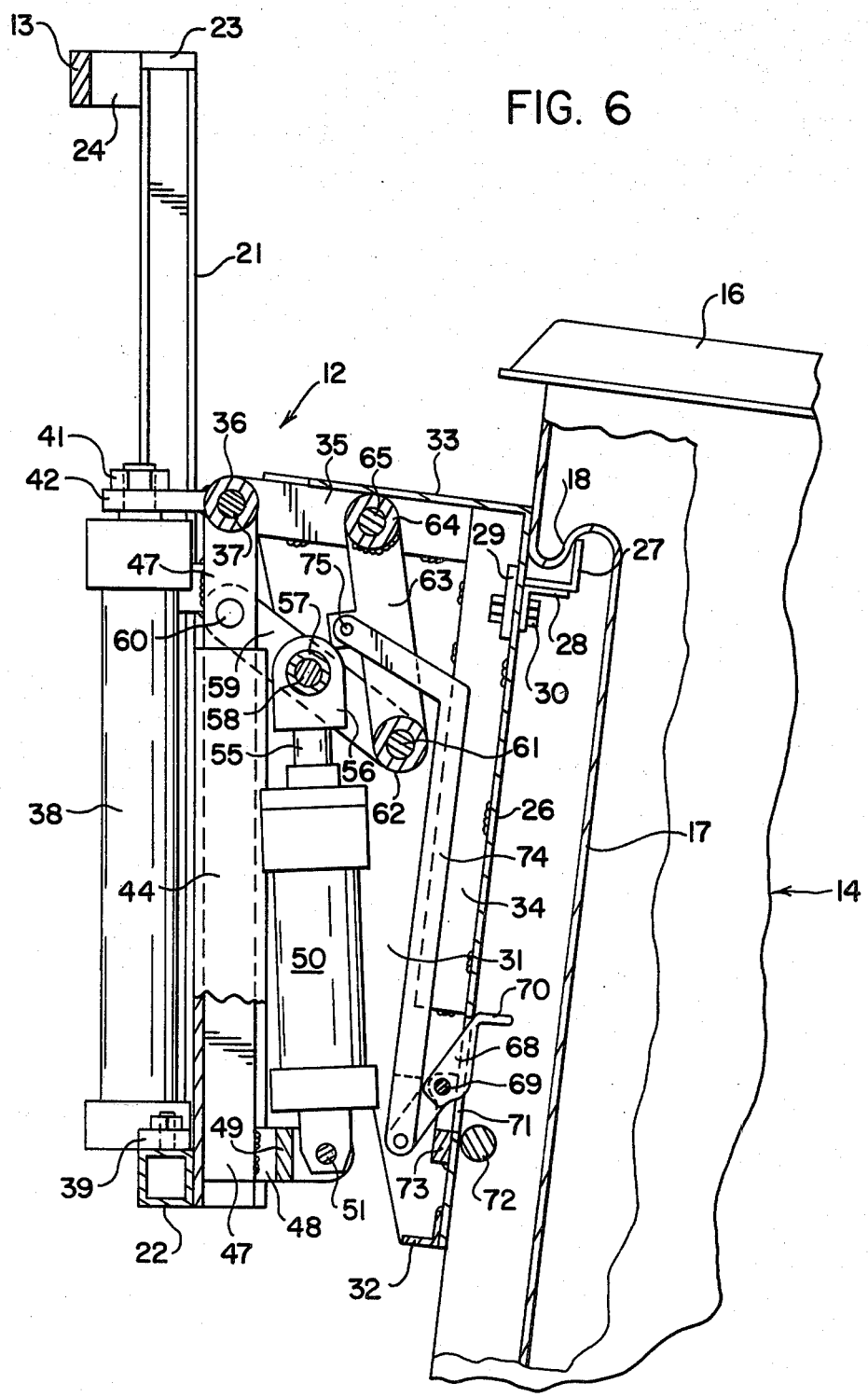
FIG. 6 is an enlarged partial elevation similar to FIG. 1, partly broken away and in section, on line 6—6 of FIG. 4.
Figure 7:
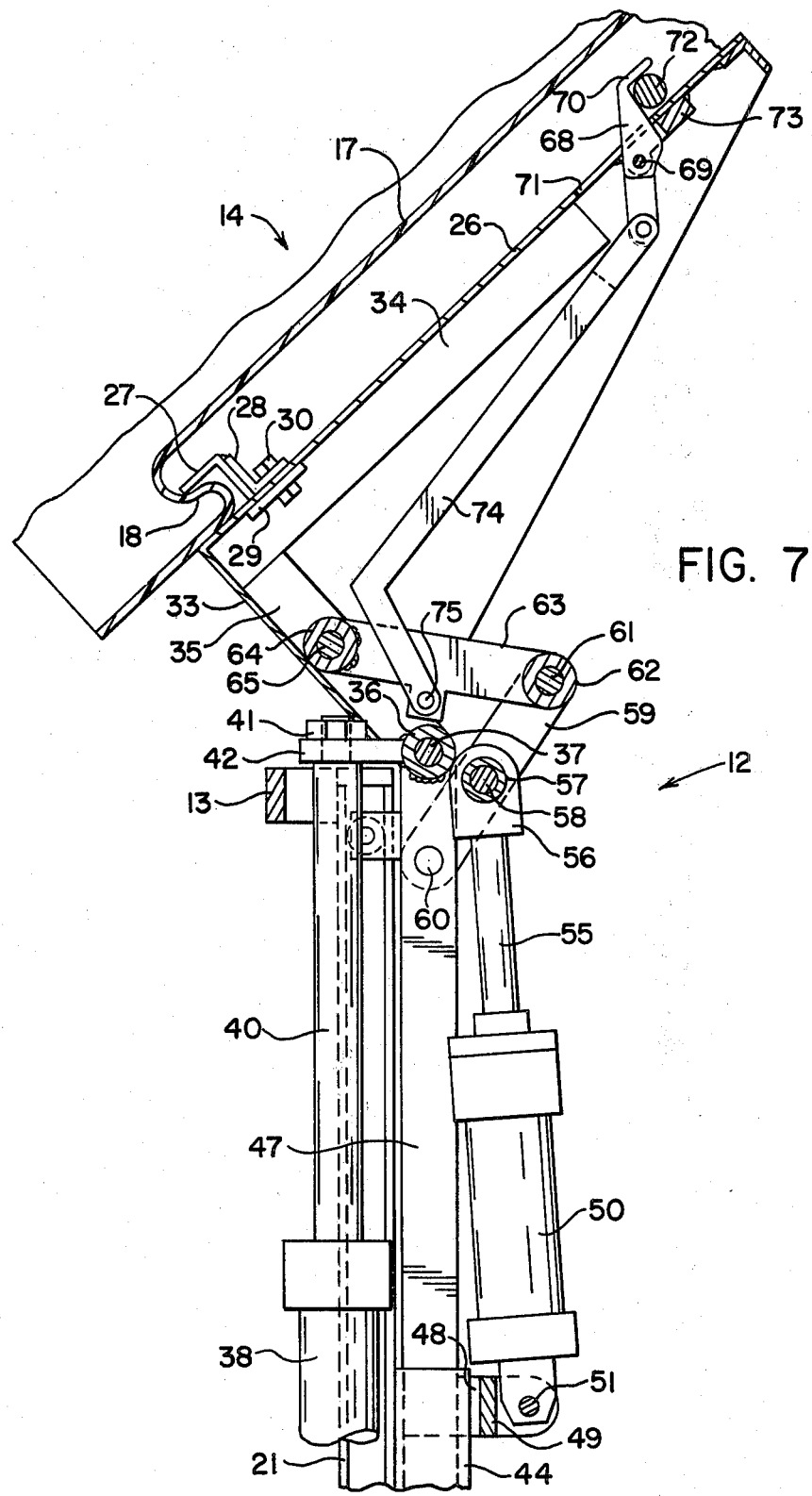
FIG. 7 is an enlarged partial elevation similar to FIG. 2, partly broken away and in section.

The improved dump unit is adapted to be mounted on a stationary compactor indicated generally in phantom lines at 10 in FIGS. 1 and 2, having a hopper 11. The dump unit indicated generally at 12 is mounted on the frame of the compactor, which may include a horizontal frame bar 13 (FIGS. 5-7). The dumping and lifting mechanism 12 is adapted to be used with a mobile waste container, or receptacle, indicated generally at 14, supported on wheels 15, and having a top cover 16 hinged to the rear upper edge of the receptacle. The front wall of the receptacle has a vertical recessed wall 17 preferably extending upwardly from the bottom of the receptacle and terminating at an overhanging shoulder 18 near the top of the receptacle for engagement with the lifting mechanism.

Figure 4:
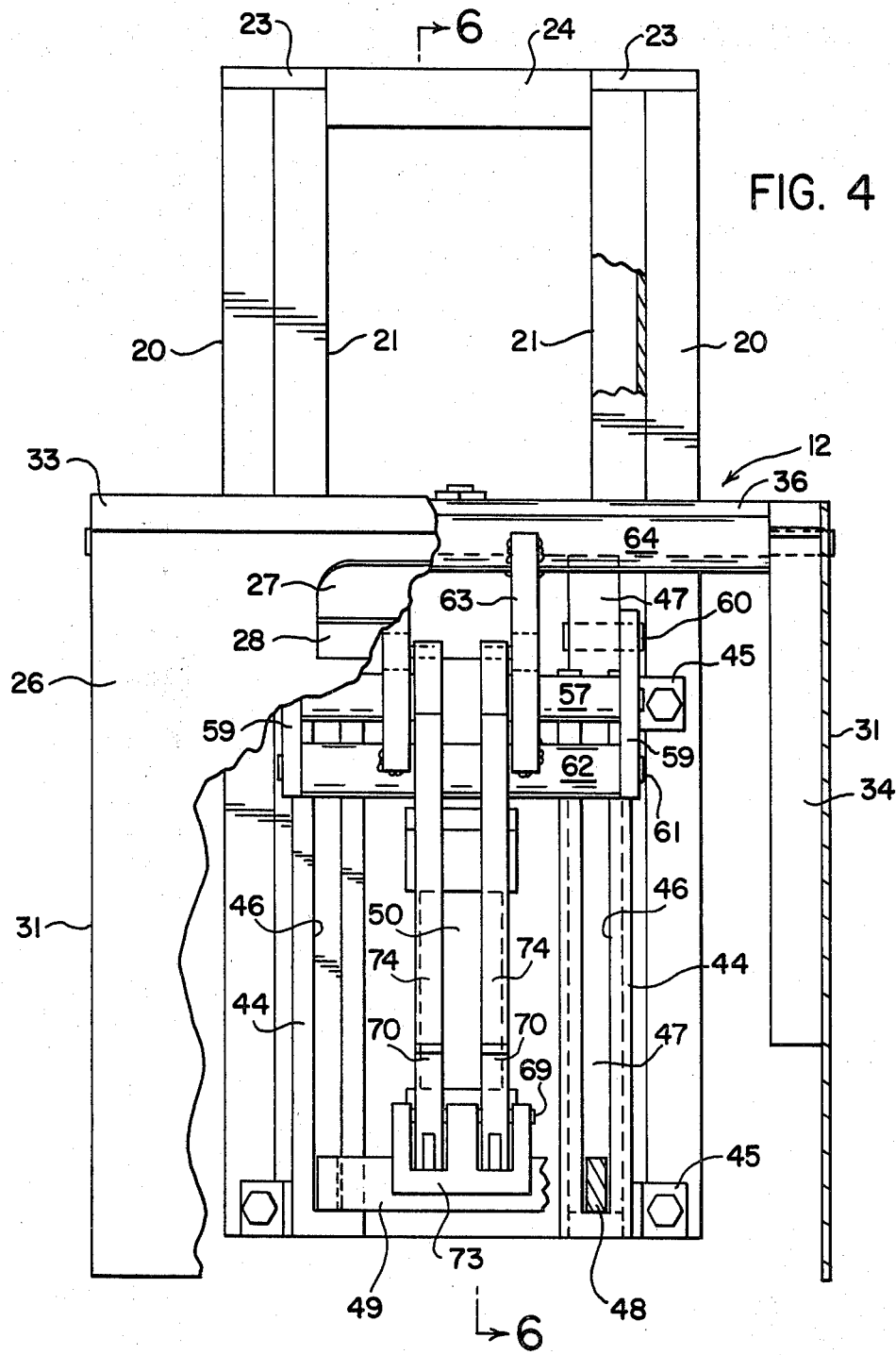
FIG. 4 is an enlarged vertical elevation partly broken away and in section, on line 4—4 of FIG. 1.

The dump unit 12 preferably has a vertical mounting frame of rectangular configuration comprising laterally spaced, preferably square tubes 20 and C-shaped, preferably square tubes or channels 21 parallel with tubes 20 and welded to their inner sides with the open inner sides of the tubes 21 facing each other (FIGS. 4 and 5). The bottom ends of tubes 20 are connected by a cross tube or bar 22 welded thereto, and the bottom ends of tubes 21 are secured to and supported by cross tube 22 which may be secured to the compactor 10. The upper ends of tubes 20 and 21 are preferably capped by plates 23, and a horizontal cross bar 24 is secured to the rear sides of the upper ends of tubes 20 and 21 and welded to the horizontal frame bar 13 of the compactor.

The lifting and dumping mechanism of dump unit 12 includes a front face plate 26 which is presented to the front of the container 14, and the face plate has an outer upturned transverse angle 27 secured near its upper edge to form a saddle for engaging under the shoulder 18 on the container to lift the container. The angle 27 is preferably supported on a transverse angle 28 backed by a reinforcing bar 29 on the inner surface of the face plate, the angle 28 and bar 29 being bolted to the face plate by bolts 30.

The face plate 26 preferably has triangular side walls 31 with a transverse angle 32 extending between their bottom ends, and a top plate 33. Reinforcing bars 34 may be welded in the corners between the side walls 32 and face plate 26, and reinforcing bars 35 may be welded in the corners between side walls 32 and top plate 33, with the ends of bars 35 welded to the top portions of reinforcing bars 34. A cross tube 36 extends between the rear ends of reinforcing bars 34, and has a pivot shaft 37 journaled therein, the ends of said shaft preferably being secured to said bars.

The means for lifting the face plate 26 and container 14 supported thereon to the top of frame tubes 20 and 21 and the top of the hopper 11 of the compactor preferably comprises a hydraulic cylinder 38, mounted at its lower end by brackets 39 on cross tube 22. The upper end of the piston rod 40 (FIG. 7) in cylinder 38 is secured by bolt 41 to an ear 42 extending rearwardly from the medial portion of cross tube 36.

Figure 3:
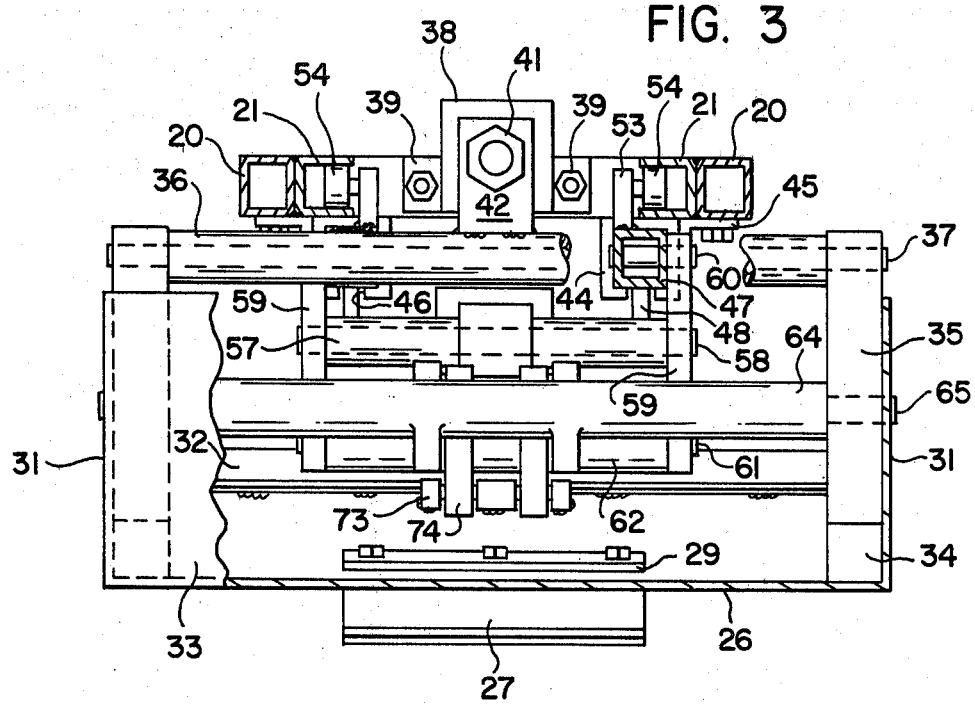
FIG. 3 is an enlarged plan view, partly broken away and in section, on line 3—3 of FIG. 1.

Laterally spaced vertical guide tubes 44 preferably rectangular in cross section, are positioned in front of the vertical tubes 21, and are bolted to the tubes 20 by angle brackets 45 (FIGS. 3 and 4). The guide tubes have vertical slots 46 on their front sides. Slide tubes or bars 47 of rectangular cross section are slidably mounted in the guide tubes 44 and have front flanges 48 at their lower ends extending slidably through slots 46. The ends of flanges 48 are connected by a cross bar 49 and the bottom end of a hydraulic cylinder 50 is pivoted at 51 on a bracket extending forwardly from bar 49 (FIGS. 6 and 7).

The upper ends of slide tubes 47 project above the upper ends of guide tubes 44 in the lowered position of the face plate 26 shown in FIG. 6, and the upper ends of tubes 44 are welded to cross tube 36. The upper projecting end portions of slide tubes 47 are provided with rearwardly projecting bracket ears 53 on which are mounted rollers 54 extending on opposite legs thereof (FIGS. 3 and 5).

At the start of the lifting and dumping operation, the cylinder 38 is energized by suitable control means and the piston rod 40 lifts the cross tube 36 and the face plate assembly supported thereon to the top of the tubes 21, at which time the mechanism to rotate the face plate assembly and container 14 to the dumping position of FIGS. 2 and 7 is actuated by energizing cylinder 50 through suitable control means.

The piston rod 55 of cylinder 50 is connected by a bracket 56 to the medial portion of a transverse tube 57 having a pivot shaft 58 journaled therein. The medial portions of links 59 are pivoted to tube 57 at the ends of shaft 58, and the links 59 are pivoted at one end at 60 to the slide tubes 47 and at the other end at 61 to a cross tube 62. A pair of lever arms or links 63 is welded at one end to tube 62 intermediate its ends, and the other ends of links 63 are welded to a transverse tube 64 pivoted at its ends to the bars 35 on pivot shafts 65.

When the piston rod 55 is actuated, the linkage comprising levers or links 59, 63 and 35 produces a mechanical advantage in rotating the face plate assembly around pivot shaft 37 from the position of FIG. 6 to the dumping position of FIG. 7.

Means to prevent the container 14 from sliding downwardly off the face plate 26 in the dumping position preferably includes levers 68 pivoted at 69 on the inside of the face plate and having hooked ends 70 extending through an opening 71 in the face plate. The hooked ends 70 are adapted to engage a transverse abutment bar 72 in the recess at the front of the container 14 when the container is in the inverted dumping position of FIGS. 2 and 7.

The levers 68 are pivoted intermediate their ends to a bracket plate 73 secured to the inside of the face plafte 26 and bell crank levers 74 are pivoted at their lower ends to the inner ends of levers 68. The upper ends of bell crank levers 74 are pivoted at 75 to the links 63. Accordingly, as the face plate is rotated by the piston rod 55 through the linkage 59, 63 and 35 to the position of FIGS. 2 and 7, the bell cranks 74 will automatically swing the hooked ends 70 of levers 68 under the bar 72 to lock the container in its inverted dumping position.

When the waste material has been dumped into the hopper of the compactor, the piston rod 55 is retracted to return the face plate assembly to its upright position, and the piston rod 40 is then retracted to return the container 14 to the ground level position of FIG. 1, for removal of the empty container.

The improved lifting and dumping mechanism provides a simple and inexpensive dumping unit for dumping trash from a mobile container into a compactor, by lifting the container from ground level to the necessary height and then inverting the container to dump the trash into the compactor.

The linkage assembly of the dumping mechanism provides a mechanical advantage during the dumping operation, and automatically operates the means to lock the container in inverted dumping position.

I claim:

1. A dumping unit for lifting and dumping a waste receptacle into a compactor, comprising a frame mounted on the compactor, laterally spaced vertical slide bars slidably mounted on said frame, a fluid cylinder on said frame for raising said slide bars, a face plate assembly pivoted on the upper ends of said slide bars and having a support saddle at its upper end, a second fluid cylinder mounted on the lower ends of said slide bars, linkage means connecting said face plate and said second cylinder to rotate said face plate and invert a receptacle supported on said saddle to dumping position, a hook lever pivoted on said face plate assembly and adapted to engage an abutment on said receptacle to lock it in inverted dumping position, and a bell crank link connecting said hook lever to said linkage means to move the hook lever into engagement with said abutment as the face plate assembly is rotated to invert the receptacle.

2. A dumping unit for lifting and dumping a waste receptacle into a compactor, comprising a frame mounted on the compactor, laterally spaced vertical slide bars slidably mounted on said frame, a fluid cylinder on said frame for raising said slide bars, a face plate assembly pivoted on the upper ends of said slide bars and having a support saddle at its upper end, a second fluid cylinder mounted on the lower ends of said slide bars, and linkage means connecting said face plate and said second cylinder to rotate said face plate and invert a receptacle supported on said saddle to dumping position, said linkage means including a lever arm connected intermediate its ends to the piston of said second cylinder, one end of said lever arm being pivotally connected to said slide bars and the other end pivotally connected by a link to the top of said face plate assembly.

3. A dumping unit as described in claim 2, wherein a hook lever is pivoted on said face plate and adapted to engage in abutment on said receptacle to lock it in inverted dumping position.

4. A dumping unit as described in claim 3, wherein a bell crank link connects the hook lever to said link means to move the hook lever into engagement with said abutment as the face plate assembly in rotated to invert the receptacle.

5. A dumping unit for lifting and dumping a waste receptacle into a compactor, comprising a frame mounted on the compactor, laterally spaced vertical slide bars slidably mounted on said frame, a fluid cylinder on said frame for raising said slide bars, a face plate assembly pivoted on the upper ends of said slide bars and having a support saddle at its upper end, a second fluid cylinder mounted on the lower ends of said slide bars, linkage means connecting said face plate and said second cylinder to rotate said face plate and invert a receptacle supported on said saddle to dumping position, a cross tube connecting the upper ends of said slide bars, said face plate assembly being pivoted at its rear end to the ends of said cross tube and the second fluid cylinder being mounted on a cross bar connecting the lower ends of said slide bars, a hook lever pivoted on said face plate assembly and adapted to engage in abutment on said receptacle to lock it in inverted dumping position, and a bell crank link connecting the hook lever to said link means to move the hook lever into engagement with said abutment as the face plate assembly is rotated to invert the receptacle.

6. A dumping unit as described in claim 5, wherein the frame has laterally spaced vertical guide channels, and rollers mounted on said slide bars are movably received in said guide channels.

* * * * *

UNITED STATES PATENT AND TRADEMARK OFFICE
CERTIFICATE OF CORRECTION

PATENT NO. : 4,422,814
DATED : December 27, 1983
INVENTOR(S) : Ernest D. Borders It is certified that error appears in the above–identified patent and that said Letters Patent are hereby corrected as shown below:

Column 3, line 21, after "extending" insert --into the open sides of C-shaped tubes 21 for rolling--.

Column 3, line 56, "plafte" should read --plate--.

Column 4, line 56, "in" should read --is--.

Signed and Sealed this

Thirty-first Day of July 1984

[SEAL]

Attest:

GERALD J. MOSSINGHOFF

Attesting Officer

Commissioner of Patents and Trademarks